No. 798,938. PATENTED SEPT. 5, 1905.
H. E. WETHERILL.
HYGROSCOPE.
APPLICATION FILED JULY 18, 1904.
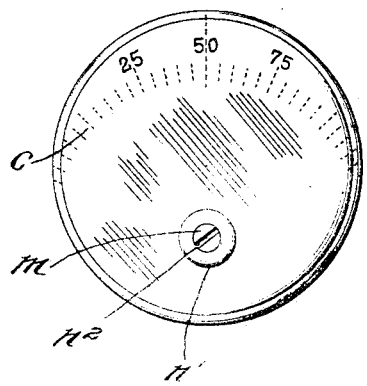
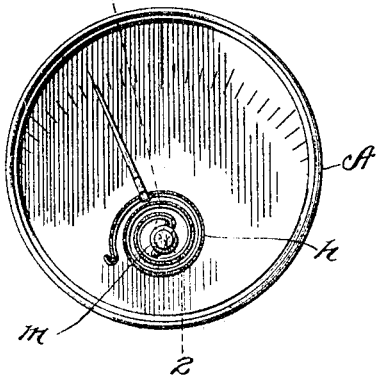
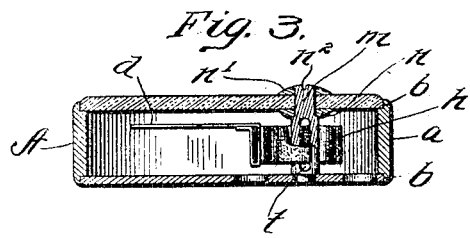
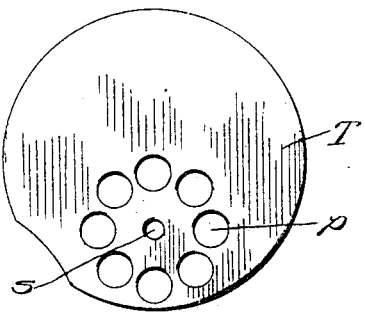
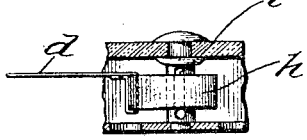
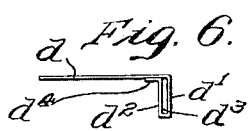
WITNESSES:
F. J. Hartman.
A. M. Biddle.
INVENTOR
Henry Emerson Wetherill

UNITED STATES PATENT OFFICE.

HENRY EMERSON WETHERILL, OF PHILADELPHIA, PENNSYLVANIA.

HYGROSCOPE.

No. 798,938. Specification of Letters Patent. Patented Sept. 5, 1905.

Application filed July 18, 1904. Serial No. 217,021.

*To all whom it may concern:*

Be it known that I, HENRY EMERSON WETHERILL, a citizen of the United States, residing in the city of Philadelphia, State of Pennsylvania, have invented certain new and useful Improvements in Hygroscopes, of which the following is a full, clear, and exact description, reference being had to the accompanying drawings, forming a part of this specification.

My invention relates to hygroscopes, and has for its object to provide a reliable instrument of that class which while capable of use in general meteorological work is adapted especially for measuring the perspiration in pathologic diagnosis. Heretofore no such instrument has been at the service of the medical profession except one or two, which are expensive to construct, easily broken or operatively disrupted, and not capable of accurate adjustment nor adapted to use under many conditions which commonly prevail in the laboratory, especially in pathologic diagnosis.

My invention has for its object to provide an instrument of this class not open to these objections which shall be durable, simple, compact, cheap in construction, readily adjustable, perfectly air-tight under proper application, and reliable in its measurements of moisture.

To these ends it consists of the device hereinafter described, the novel features in which will be pointed out in the several clauses of claim.

In the drawings illustrating my invention, Figure 1 is a plan view of the dial-plate, showing no other part of the instrument except the end of the spring-post which projects through the dial and the washer, to which said end is riveted. Fig. 2 is a bottom plan view of the device with the perforated bottom plate removed. Fig. 3 is a vertical section on line 1 2 of Fig. 2 looking to the left. Fig. 4 is a plan view of the perforated bottom plate. Fig. 5 is a side elevation intended to illustrate the construction and arrangement of certain elemental features, and Fig. 6 is a side elevation of the indicator.

The shell or casing A is of stiff metal and light in weight, and for these purposes I make it of aluminium, and this metal is desirable, as it avoids condensation of moisture, which would affect the degrees of humidity measured. Its vertical wall $a$ is preferably annular in shape, and at each head end it is provided with an internal shoulder $b\ b$, slightly beveled, the function thereof being to removably hold the correspondingly-shaped annular edge of the dial-plate and of the perforated bottom plate, both hereinafter described.

The dial-plate contains upon its top or outer surface the numerals "25, 50, 75," or others, indicating relative humidity percentages of moisture, and on its under or inner surface the dial-plate contains the index-line $c$. (Shown in Fig. 1 in dotted lines.) For purposes of lightness and durability and to lessen the amount of moisture deposit on the dial I have substituted for glass a thin and transparent celluloid as the material for the dial-plate as being preferable. Mica, glass, gelatin, or other transparent or translucent material can be used, but with less advantage.

The indicator-finger $d$ (shown in detached elevation in Fig. 6) must necessarily be of the lightest possible weight, and for this reason, while preserving stiffness, I make it of aluminium. It consists of a thin rod bent downward at its inner end to form the side $d'$, then upward to form the side $d^2$, the purpose being to form a loop $d^3$. A third bend $d^4$ is preferably added to better preserve the stiffness of the loop-walls. An arrow or perforated point may be used, the width of the point being one-fifth the distance between the smallest graduations of the scale.

The sensitive spring $h$ is made spiral in form. It is a thin copper band covered on the outer side with a thin membrane fastened to the surface of the metal by cement, such as rubber-cement. The copper may be plated or dipped in a lacquer to protect it from corrosion. I have discovered by a series of experiments that the skin of an egg—namely, the membrane next to the shell and that surrounds the albumen—is exceedingly desirable for that purpose, though paper, gelatin, the known photo-negative films, or human hair freed from fat may be substituted, but with less advantage. The membrane or its said substitutes in order to make it more highly sensitive to moisture must be treated with a chemical solution. As a preservative of it, but chiefly to make it contract under the slightest moisture, I prepare the membrane by submitting it to a coating of chlorid of cobalt, for which purpose a four-tenths saturated aqueous solution is best, as found by extensive testing. Herein lies a basic principle of my invention—namely, in the provision of a hygroscopic membrane chemically treated with a hygroscopic salt; but the mounting of such a membrane upon a metallic band carrying the indicator-point is equally fundamental, and so, also, is the provision of such a band in the form of a spiral or so that the change of size of the membrane will cause the copper spring to move radially.

The metallic support for the chemically-treated membrane is preferably made for a medical hygroscope of a thin springy copper band two-thousandths of an inch in thickness and three-sixteenths of an inch in width, though silver metal would answer or gold alloy. The band is to be spiraled. Each end is preferably given a short bend to bind the membrane thereon, and is preferably pointed or narrowed at the inner end for easy insertion in the supporting-post hereinafter described. It is spiraled enough to give two and one-half turns or rounds when the indicator shows seventy-five per cent. of humidity and is so spiraled and arranged in the post that the final or outward turn or bend of the metal band will impart a circular plane of movement to the indicator carried thereby, centering on the supporting-post as its axis in order that it shall always rotate in a true circular path. The first turn of the spiral must also be a circular curve.

The indicator is mounted on the spiral metal band by slipping its loop over the outward end of the metal band, and obviously this construction and arrangement of the parts will provide for the general adjustability of the indicator on its spiral metallic carrier, a new and important factor of great value. The indicator clamps firmly in its place on its carrier without the use of cement, which is a decided improvement.

The supporting-post $m$ is substantially a cylinder of metal with reduced shouldered ends at either or both extremities. The upper end is supplied with a lower washer $n$, and its projecting end above the washer passes through an aperture in the dial-plate, and another washer $n'$ is placed thereon above the dial-plate, the top being then riveted on the upper washer. The extreme top end of the post is slotted, as at $n^2$, Fig. 1, so that the post, indicator, and its spiral carrier can be moved rotatably as a whole for the purpose of final adjustment. The body portion of the post is slotted longitudinally, as at $t$, as it is within this slot that the inner end of the spiral metal band is inserted and thereby mounted; but the slot is made slightly longer than the width of the band in order that it may be adjusted vertically on the post.

The instrument can be and frequently is with advantage used with an open base; but I prefer to provide a basal covering in the form of the annular plate T. (Shown in Fig. 4.) This plate is of light aluminium metal, with an edge adapted to fit the inner shoulder on the edge of the casing or shell. It is perforated in several places, as at $p$, in the region of the spiral spring to admit cutaneous moisture in the form of vapor from the body when placed upon a patient. The basal plate will prevent hairs from stopping the motion of the spiral carrier.

The smaller perforation $s$ is provided to admit the passage therein of the lower end of the post, thereby not only holding the parts together, but bringing the apertures $p$ immediately below the sensitive spiral band carrying the indicator. To remove the closing-cap and open the casing, it is merely necessary to lightly press the head of the supporting-post.

The operation of the device is obvious from the description given, and it is sufficient to note that the fundamental principle in the mode of operation of the indicator-carrier is the spiral form of the sensitive carrier, which being covered with a chemically-sensitized membrane contracting under the effect of moisture or expanding under the loss of such moisture absorbed causes the balanced indicator to rotate radially. The changes of color which take place in the chemically-treated membrane may be used to standardize the instrument in comparison with a chlorid-of-cobalt color-scale.

Some of the decided advantages of my device from a mechanical standpoint are that it is simple in construction, of few parts, and most of its elements replaceable without affecting the others. From a medical point of view it is easily cleaned, can be made antiseptic, its form and character are such that it can be applied to the skin or in other ways to a patient, so as to exclude all atmospheric humity, and after use its perforated plate can be removed and the casing inverted, so that the moisture inside the instrument will pass off and the elements restored to mark the normal humidity of the outside atmosphere. The markings of the indicator in clinical diagnosis can be plotted on charts similar to those used in the wards of hospitals, and as the determination of the amount of perspiration in different conditions is of considerable diagnostic, therapeutic, and prognostic value it is important to have an instrument that will mathematically express the condition, and thus aid in symptomatology and secondarily in treatment. With my instrument properly applied, as aforesaid, to the skin of a patient the indicator will in a few minutes enable a correct reading of the percentage of moisture to be made.

Having thus described my invention, I claim as new and desire to secure by Letters Patent—

1. In a hygroscope, a hollow supporting-frame, a transparent dial-plate thereon, a post mounted in said dial-plate and extending within the frame, a spiral metallic band lined on one side with a contractible material which has been made sensitive to moisture, said spiral band being arranged edgewise within the frame and mounted by one end in said post, and an indicator carried on the free end of said band, operating to move radially on the surface of the dial-plate.

2. In a hygroscope, the combination with a suitable containing-casing provided with a graduated dial-plate, of a post supported within the casing, an indicator-carrier mounted edgewise and by one of its ends in said post, said carrier consisting of a flat spiral band having a plurality of true circular curves whereby its free end may rotate in the arc of a true circle, said carrier-band being made sensitive to moisture, and an indicator-finger mounted on the free end of the spiral carrier.

3. In a hygroscope comprising a hollow containing-casing, cylindrical in shape, a transparent dial-plate closing one end thereof, an indicator-carrier post, means to support one end of said post rotatably in said dial-plate, a spiral band of metal, a covering on said band, which is made sensitive to moisture, an indicator-finger mounted on the free end of said band, and a removable plate forming the bottom of the casing and provided with an opening to receive the lower end of the post when the instrument is closed.

4. In a hygroscope, an indicator-carrier consisting of a spiraled band, means supporting it at one end, in such manner that its free end will move radially under a longitudinally-exerted force, and a lining cemented to one side thereof, said lining consisting of the skin of an egg which has been coated with chlorid of cobalt.

5. In a hygroscope, a containing-casing, a transparent dial-plate thereon, a longitudinally-slotted post supported within the casing, a spiral indicator-carrier covered with a sensitive membrane, and having one of its ends mounted vertically adjustable in the slotted post, and an indicator carried on the free end of the spiral carrier.

6. In a hygroscope, the combination with a suitable casing and a sensitized spiral indicator-carrier mounted therein, of an indicator the rear end of which is provided with a loop whereby it may be supported adjustably on the indicator-carrier.

7. In a hygroscope, a longitudinally-slotted post, a spiral band, made contractible under moisture and having its inner end mounted vertically adjustable in said post, and an indicator-finger having a looped end mounted longitudinally adjustable on the free end of the spiral band.

8. In a hygroscope, a containing-casing, a transparent dial-plate thereon, a post maintained by one end in the dial-plate, a removable perforated base-plate for the casing, an opening in said plate to receive the lower end of the post, and a sensitized spiral indicator-carrier mounted by one end in said post.

9. In a hygroscope, a hollow casing interiorly shouldered at one end, a perforated plate adapted to be removably held in the shouldered end of the casing, a transparent dial supported in the opposite end of the casing, a post supported within said casing, a spiral band lined with a contractible material made sensitive to moisture and mounted edgewise by one end in said post; and an indicator-finger mounted on the free end of said spiral band.

In testimony whereof I have hereunto affixed my signature this 12th day of July, A. D. 1904.

HENRY EMERSON WETHERILL.

Witnesses:
HENRY T. GULLMANN,
H. I. FENTON.